3,299,176
COMPATIBLE BLENDS OF 1-OLEFINS
Ruskin Longworth, Wilmington, Del., assignor to E. I. du Pont de Nemours and Company, Wilmington, Del., a corporation of Delaware
No Drawing. Filed June 24, 1963, Ser. No. 290,188
6 Claims. (Cl. 260—876)

This invention relates to novel plastic compositions, and more particularly to blends of modified polymers of the 1-olefins.

Current engineering practice in the use of plastics demands that the properties of the plastic selected be adapted as closely as possible to the needs of the particular article to be made. This demand is met in large measure by the choice of material, and by choice of particular grades, generally determined by such factors as density, stiffness, melt viscosity, and the like. Further variations in the properties of plastics have been attained by copolymerization or the employment of fillers, plasticizers or the like. Copolymers, however, are necessarily made by the manufacturer, and therefore are generally only available when the applications demand large quantities. Fillers and the like may be introduced by the processor to fit a specific job, but the utility of fillers in modifying polymer properties is somewhat limited.

Another approach to the modification of plastic properties is by blending, generally by blending melts of polymers in a Banbury mill or an extruder, although solution blending has also been employed. This approach has been successful in a few instances, but, for many applications, the properties of blends have been erratic. These problems have been traced to the incompatibility of the component polymer.

The problem is well illustrated by blends of polyethylene containing from 10 to 85% by weight of the total of polypropylene. Although such blends have been found advantageous for a few specific purposes, in many applications, deficiencies have become apparent. The problem is more severe the more nearly equal the proportions of the components, and also the more dissimilar their viscosities. Thus, in one case it was found that whereas the individual components of such a blend may be melt spun to fibers at a rate of several thousand feet/minute, a 50% by weight blend of each component could not be spun at a rate exceeding 200 feet/minute. Similarly, the individual polymers could be separately coated onto paper at 1000 feet/minute, an intimate blend could only be coated onto paper at speeds of about 50 feet/minute. Again when such blends were injection molded in complex molds, very weak melt welds were formed in the molding.

Examination of such blends in the molten state under the microscope shows that two phases in the form of substantial agglomerates are present, even when particularly severe mixing means are employed. It is believed that the incompatibility is responsible for the aforesaid and like difficulties.

It has now been found that incompatible blends of polymers and copolymers of the 1-olefins may be rendered compatible by grafting an acid monomer onto one component of the blend, and a basic monomer onto the other component prior to mixing.

Surprisingly the amount of monomer which need be grafted in each case is extremely small, and, as will be apparent from the disclosure hereinafter, the grafting may be accomplished by simple means well adapted to the manufacture of small lots useful for specific and limited applications. Generally, only 0.1 to 0.5% by weight of an acidic or basic monomer need be grafted to each component of the blend in order to achieve complete compatibility. This minor modification is generally insufficient to detract from the desirable properties of the homopolymers or copolymers.

An even more surprising result has been attained by the solubilization procedure of the present invention. Whereas the components of the prior art blends crystallize substantially independently at rates characteristic of the individual components, the blends of the present invention tend to crystallize at a rate equal to the rate of the more slowly crystallizable component. Thus, a wider range of working temperatures and times may be provided for those processes which depend on a plastic formative state below the melting point, in particular, in such processes as extension leading to molecular orientation.

Examples have been known heretofore when the blending of polymers has resulted in nucleation, i.e., an acceleration of crystallization. However, in the instant case, the very opposite result, namely, the retardation of crystallization, has been achieved.

Accordingly, the present invention comprises an intimate melt blend of from 1 to 99 parts by weight of a first, modified, partially crystalline polyolefin polymer and from 99 to 1 parts by weight complementally of a second, modified, partially crystalline polyolefin polymer; the polyolefin, in each instance, being chosen from polyethylene, polypropylene, polybutene-1, poly-4-methyl pentene-1, or the like. The first component is modified by chemical incorporation therein, preferably by melt grafting in the presence of oxygen, of from 0.1 to 0.5 percent by weight of a low molecular weight, unsaturated acid-containing monomer, preferably having from 3 to 20 carbon atoms, and more preferably having from 3 to 6 carbon atoms. The second partially crystalline polyolefin compound of the blend is modified by the chemical incorporation therein of from 0.1 to 0.5 percent by weight of an unsaturated nitrogenous base having from 4 to 20 carbon atoms. Again the preferred process of incorporation is by melt grafting in the presence of oxygen.

With regard to the unsaturated acidic compounds which may be incorporated with a blend component, any unsaturated acid having from 3 to about 20 carbon atoms may be employed. Lower molecular weight additives containing from 3 to 6 carbon atoms are preferred. The acids may be monobasic, dibasic, or polybasic, and may optionally contain functional groups other than acidic groups. Examples of suitable acids are half esters of difunctional hydroxy acids, etc., acrylic acid, methacrylic acid, maleic acid, fumaric acid, itaconic acid, citraconic acid, mesaconic acid, crotonic acid, angelic acid, tiglic acid, oleic acid, undecenylic acid, citronellic acid, geranic acid, linoleic acid and the like.

It is also contemplated to employ unsaturated acids having a sulfonic acid grouping.

The unsaturated compounds containing basic groups are preferably nitrogenous bases such as amines, and preferably tertiary amines, of relatively low molecular weight, i.e., generally from 4 to 20 carbon atoms. Included are unsaturated amines $CH_2=CH-CH_2NR_2$, wherein R is a lower alkyl group or hydrogen, and homologues and isomers thereof, compounds such as N,N-dialkyl aminoethylmethacrylate and the like, and vinyl heterocyclic bases such as vinyl pyridine, vinyl pyrrolidone and vinyl carbazole.

The thermoplastic components of the blends are polymers of the 1-olefins including polyethylene, isotactic polypropylene, isotactic polybutene-1, isotactic poly-4-methyl pentene-1, and the like. Small amounts of other copolymerizable monomers may be included in the polymeric compositions.

The acidic and basic components may be bound to the polymeric materials by a variety of techniques which are known to those skilled in the art, e.g., by copolymerization or by grafting in the presence of chemical agents such as the peroxides, or by the action of high energy particulate radiation or ultraviolet radiation on a mixture of the polymer and the monomer.

In view of the small concentrations required to achieve the ends of this invention, the grafting process is preferred and may be accomplished by milling the polymer and the selected basic or acidic monomer together at an elevated temperature, suitably from 200 to 300° C., and preferably about 250° C. The extent to which grafting has occurred may be determined by infrared analysis of the product.

The blending of the modified polymer can likewise be accomplished by a variety of techniques known to the art, e.g., by an extruder, especially extruders equipped with a special mixing screw such as may be employed for the pigmentation of polymers; by milling on rolls or compounding in a Banbury mixer, or by solution blending.

This invention is by no means confined to simple binary blends, but encompasses blends of three or more differing polymers.

Many other modifications of this invention will be apparent to those skilled in the art.

The invention is further illustrated by the following examples which should not, however, be construed as limiting the scope thereof.

EXAMPLE I

The compatibility of substantially linear polyethylene and isotactic partially crystalline polypropylene blends was studied by weighing quantities of the two polymers into a Carius tube, together with a weighed amount of alpha-chloronaphthalene solvent, replacing the air by nitrogen and determining whether the mixture was compatible at the selected temperature of 200° C., and plotting the results on a triangular diagram. By extrapolation, it was determined that polymeric blends in the range between 5% and 85% by weight of polypropylene were incompatible. Blends of the two polymers made in this range were observed under the polarizing microscope and found to separate into individual phase in macroscopic regions of the order of 1 mm., the structure being readily apparent upon cooling to room temperature.

A quantity of the same polyethylene was thereafter treated with methacrylic acid on mixing rolls at 250° C. for ten minutes. After cooling to room temperature, the polymer was dissolved in alpha-chloronaphthalene and precipitated by the addition of about 10 volumes of methanol to remove unreacted methacrylic acid. The degree of grafting was then determined by infrared analysis to determine the carboxylic acid content. For the addition of 1% methacrylic acid, a carboxyl content of the final polymer of 0.12 $CO_2H$ groups/1000 carbon atoms was found. For 5% addition, 0.37 $CO_2H$ groups/1000 carbon atoms were found.

Polypropylene was likewise grafted with small amounts of N,N-diethylamino ethylmethacrylate.

The polymer containing 0.37 $CO_2H$ groups/1000 carbon atoms, i.e., about 0.2 weight percent of methacrylic acid, was blended with an equal weight of polypropylene grafted with N,N-dimethylamino ethylmethacrylate. The following experiments were then performed.

A chip of the blend was placed on a glass microscope slide, heated on a hot plate and a cover slip pressed onto the assembly. The slip was then transferred to a microscope hot stage at about 200° C. Examination under polarized light showed that the melt was substantially homogeneous and that no change occurred on heating for 40 minutes. Upon cooling, the solid showed no discernable separation. No morphological structure could be found of greater magnitude than the ordinary spherulitic structures found in the homopolymers.

The rate of crystallization of the polyethylene and the polypropylene was separately determined (1) for the individual untreated homopolymers; (2) for a blend of 50% by weight of each untreated polymer; (3) for the individual treated polymer; and (4) for the blend of the treated polymer. Measurements were made by making a polymer film, heating it in an air bath to 200° C. for two minutes, plunging the heated film into a bath of rapidly circulating air maintained at a constant temperature of 120° C. ±0.1° C., and observing the peak intensity of a characteristic crystallinity band for each polymer as a function of time. The results are given in Table 1, expressed as an induction time for the onset of crystallization and as the percentage of crystallization per minute.

Blending tests were performed on small bars molded from the incompatible (untreated) 50 weight percent blend and upon the compatible (treated) blend. The compatible blend was strong and flexible, as were the parent polymers, but the incompatible blend broke under the test.

Table 1

RATE OF CRYSTALLIZATION FOR COMPATIBLE AND INCOMPATIBLE BLENDS OF POLYETHYLENE AND POLYPROPYLENE

| System | Polyethylene | | Polypropylene | |
|---|---|---|---|---|
| | Induction Time (seconds) | Rate of Crystallization percent/ minute | Induction Time (seconds) | Rate of Crystallization percent/ minute |
| Individual, untreated | 46 | 16.2 | 9 | [1] 191 |
| Untreated polymer, 50% by weight blend | 13 | 18.6 | 13 | 151 |
| Individual, treated | 63 | 2.5 | 9.5 | 174 |
| Treated polymer, 50% by weight blend | 13 | 17 | 5 | 28.8 |

[1] Washed.

EXAMPLE II

Isotactic polybutene-1 prepared by the polymerization of butene-1 with a violet $TiCl_3$ catalyst activated with a co-catalyst of 2 moles of aluminum triisobutyl per mole of $TiCl_3$, was grafted by milling with about half its weight of oleic acid in the presence of air at 200° C. The residual oleic acid was extracted from the finely divided mix after cooling with carbon tetrachloride. Infrared analysis showed the resultant polymer had about 0.4 part by weight oleic acid incorporated therein.

A second component was prepared by grafting isotactic poly-4-methyl pentene-1 (prepared using a similar catalyst to that employed for the preparation of isotactic polybutene-1 described hereinabove) was grafted with 2-vinyl pyridine by adding the monomer to the hot molten polymer on mixing rolls in the presence of air. After several additions of the monomer followed by ten minutes of rolling in each instance the product was removed and analyzed by infrared spectrophotometry. About 0.2 part by weight of the 2-vinyl pyridine was found to be grafted to the parent polyolefin.

Equal parts of the modified polybutene-1 and modified poly-4-methyl pentene-1 were melted together in a melt-indexer and extruded. The strand was then cut up and re-extruded twice. After this treatment, a chip of the resultant blend was examined at 300° C. under the microscope. No phase separation could be detected. The chip appeared homogeneous on cooling and was flexible and tough.

I claim:

1. The method of compatibilizing different thermoplastic 1-mono-olefin polymers which comprises chemically incorporating by melt grafting in the presence of oxygen from 0.1 to 0.5% by weight of an ethylenically unsaturated carboxylic acid having from 3 to 20 carbon atoms in at least one thermoplastic component, chemically incorporating by melt grafting in the presence of oxygen from 0.1 to 0.5% by weight of an ethylenically unsaturated tertiary amine having from 4 to 20 carbon atoms in the remaining components, and thereafter intimately blending the components.

2. The method of claim 1 in which the acidic and basic agents are incorporated in the thermoplastic components by hot milling at a temperature in the range between 200° and 300° C.

3. The method of claim 1 in which the thermoplastic components are polyethylene and partially crystalline polypropylene.

4. A composition of matter comprising a compatible melt blend of from 1 to 99 parts by weight of a first, modified, partially crystalline poly-1-monoolefin and from 99 to 1 parts by weight complementally of a second, modified, partially crystalline poly-1-monoolefin, said poly-1-monoolefin being selected from the class consisting of polyethylene, polypropylene, polybutene-1 and poly-4-methylpentane-1, said first partially crystalline poly-1-monoolefin being modified by chemical incorporation therein by melt grafting in the presence of oxygen of from 0.1 to 0.5 percent by weight of an ethylenically unsaturated carboxylic acidic monomer having from 3 to 20 carbon atoms, and said second partially crystalline thermoplastic poly-1-monoolefin having incorporated therein by melt grafting in the presence of oxygen from 0.1 to 0.5 percent by weight of an ethylenically unsaturated tertiary amine having from 4 to 20 carbon atoms.

5. A composition of matter comprising an intimate compatible melt blend of from 5 to 85 parts by weight of a modified polypropylene and from 95 to 15 parts by weight complementally of a modified polyethylene, said modified polypropylene comprising a polypropylene being grafted thereon from 0.1 to 0.5% by weight of an ethylenically unsaturated tertiary amine monomer, and said modified polyethylene comprising a polyethylene having grafted thereon from 0.1 to 0.5 percent by weight of an ethylenically unsaturated carboxylic acidic monomer.

6. Composition of claim 4 in which said unsaturated tertiary amine monomer is N,N-dimethyl-amino - ethylacrylate and said unsaturated acid monomer is methacrylic acid.

References Cited by the Examiner

UNITED STATES PATENTS 3,236,914  2/1966  Murdock et al. _____ 260—857

FOREIGN PATENTS 814,393  2/1955  Great Britain.

MURRAY TILLMAN, Primary Examiner.

D. J. BREZNER, Assistant Examiner.